(12) United States Patent
Grizzle

(10) Patent No.: US 9,474,288 B2
(45) Date of Patent: Oct. 25, 2016

(54) AUTOMATED POULTRY HANGER

(71) Applicant: Robert L. Grizzle, Lula, GA (US)

(72) Inventor: Robert L. Grizzle, Lula, GA (US)

(*) Notice: Subject to any disclaimer, the term of this patent is extended or adjusted under 35 U.S.C. 154(b) by 0 days.

(21) Appl. No.: 14/665,771

(22) Filed: Mar. 23, 2015

(65) Prior Publication Data

US 2016/0007619 A1  Jan. 14, 2016

Related U.S. Application Data

(63) Continuation-in-part of application No. 14/120,465, filed on May 21, 2014, now abandoned.

(51) Int. Cl.
*A22C 21/00* (2006.01)

(52) U.S. Cl.
CPC ....... *A22C 21/0007* (2013.01); *A22C 21/0053* (2013.01)

(58) Field of Classification Search
CPC ............. A22C 21/00; A22C 21/0007; A22C 21/0046; A22C 21/0053; A22B 7/00; A22B 7/001; A22B 7/02; A22B 7/03; A22B 7/05; A22B 7/06
USPC .............. 452/52–54, 175–184; 119/843–846
See application file for complete search history.

(56) References Cited

U.S. PATENT DOCUMENTS

| | | | | |
|---|---|---|---|---|
| 5,088,959 | A | * | 2/1992 | Heemskerk .......... A01K 45/005 119/665 |
| 5,092,815 | A | * | 3/1992 | Polkinghorne .... A22C 21/0053 452/153 |
| 5,108,345 | A | | 4/1992 | Harben, III et al. |
| 5,134,971 | A | * | 8/1992 | Krienke ................. A01K 45/00 119/713 |
| 5,290,187 | A | * | 3/1994 | Meyn ................. A22C 21/0053 452/102 |
| 5,514,033 | A | * | 5/1996 | Berry ....................... A22B 1/00 452/178 |
| 7,134,956 | B2 | * | 11/2006 | Lee .................... A22C 21/0007 452/179 |

* cited by examiner

*Primary Examiner* — Richard Price, Jr.
(74) *Attorney, Agent, or Firm* — Thomas Horstemeyer, LLP

(57) ABSTRACT

A method and apparatus for loading live poultry onto an overhead shackle conveyor system is used in poultry processing plants. The birds (25) are placed on a horizontal moving conveyor (22) that includes dividers (34) that form a series of spaces on the surface conveyor for receiving birds. The shackles are tilted upwardly from the surface conveyor and tend to engage the legs of the bird and lift the birds out of the conveyor system and along the processing path of the poultry plant.

10 Claims, 4 Drawing Sheets

AUTOMATED POULTRY HANGER

This is a continuation-in part of U.S. patent application Ser. No. 14/120,465, filed May 21, 2014.

BACKGROUND OF THE INVENTION

Poultry processing facilities that prepare poultry ("birds") for delivery to grocery stores and to other consumers of processed foods receive live birds from transport vehicles and use a surface conveyor to begin the movement of the birds through the processing area. The first station in the processing area is the hanging station where workers lift the birds from the conveyor and hang each bird from their feet in the individual moving shackles that carry the birds in sequence to subsequent work stations in the processing plant. Each plant employs several people in this position that is generally regarded as one of the worst working positions in the plant.

At the hanging work station the workers must gather each bird and manually insert the feet of each bird in an individual moving shackle, whereby the birds hang from the shackle in a head down position. The shackles and the birds hung in the shackles continue to move in succession in an endless loop through the plant and the shackles return empty to the hanging area in the continuous process.

In U.S. Pat. No. 5,108,345 an apparatus is disclosed for hanging live birds onto shackles by placing the birds onto a conveyor belt that transports the birds in succession with the shackles on a secondary belt, so that live birds would ride in succession with the shackles on a conveyor and then workers would manually place the legs of each bird into leg holders that are also moved in succession with the shackles. But the process of hanging birds still remains primarily a manual difficult task.

SUMMARY OF THE INVENTION

Briefly described, the invention disclosed herein concerns a method and apparatus for automatically hanging live birds onto an overhead shackle transport system. A series of bird hanging shackles are moved along an overhead I-beam rail support, and as the shackles move they are lowered and tilted to a horizontal attitude and come to rest on a horizontal conveyor that moves in unison with the shackles.

Each bird is laid on a horizontal shackle and moves with the shackle, and when the shackle leaves the surface conveyor it tilts to its vertical attitude and as it tilts it captures the legs of its bird and lifts the bird by its legs away from the surface conveyor, and the bird begins its movement with the shackle through the bird processing line.

The surface conveyor system includes a surface conveyor belt and two inwardly facing parallel conveyor belts that straddle the upward facing surface of the surface conveyor belt and form with the surface conveyor belt a longitudinally extending open top channel. A recessed shape of a shackle may be formed in the upwardly facing surface of the surface conveyor belt at intervals along the surface conveyor belt. As the shackles move in unison with the surface conveyor system they are moved toward the conveyor belt and are tilted about 90 degrees and are lowered toward the surface conveyor belt so that a shackle is moved into each shape of the shackle of the surface conveyor belt.

The facing parallel conveyor belts include dividers that project across the path of the conveyor belts so that the conveyor belts and the dividers define an open top box positioned over each recessed shape of the shackle.

A bird is placed in each of the open top boxes and is positioned over the recessed shackles in the open top boxes. The boxes are sized to be slightly larger than the profile of the shackle, so the bird's legs will be located in the interior space of the shackle. As the surface conveyor system and the shackles continue to move along the processing path, the shackle conveyor begins to lift the shackles away from the surface conveyor and the upper portions of the shackles begin to tilt and rise away from the surface conveyor as the lower portion of the shackles remain at the surface of the surface conveyor. As the shackles tilt they push the upper portion of the birds laterally while the feet of the bird remain in the profile of the shackle, and as the shackle continues to move up to it's vertical position the lower portion of the shackle captures the feet of the bird and carries the bird up and away from the surface conveyor.

Thus, it is an object of the present invention to provide an automated method and apparatus for hanging live birds in the overhead shackle conveyor of a poultry processing plant.

Other objects, features and advantages of the invention will become apparent upon reading the following specification when taken in conjunction with the accompanying drawings.

DETAILED DESCRIPTION

Figure 1:
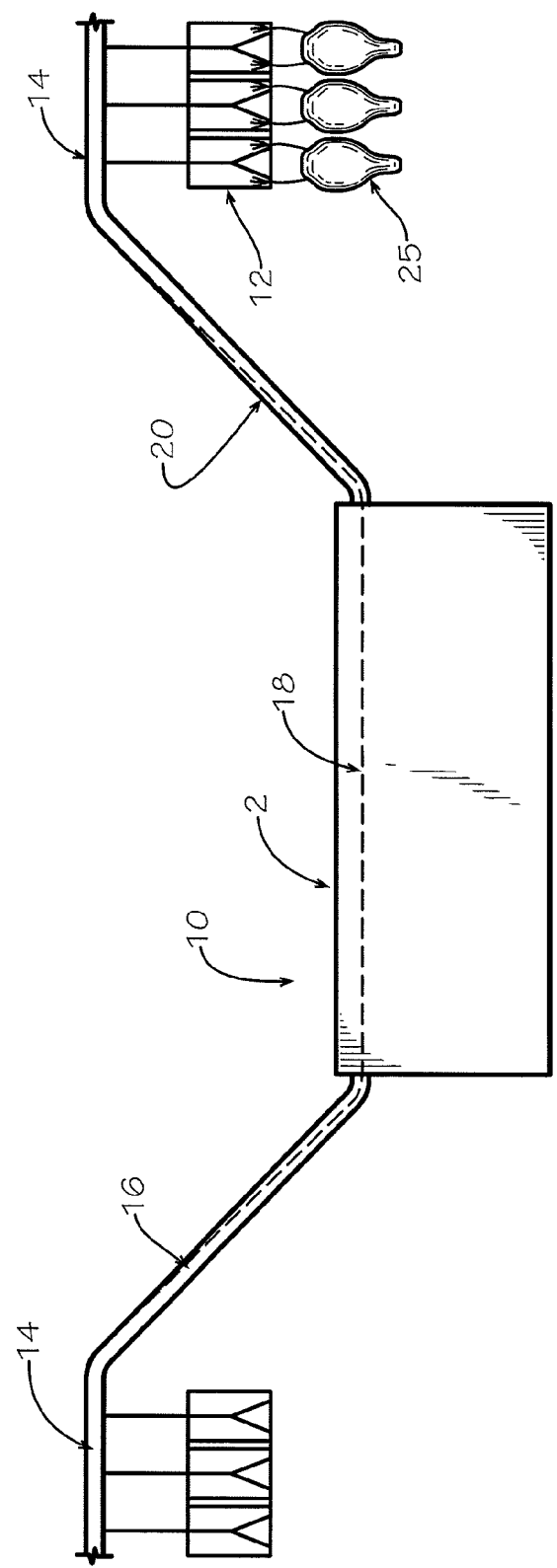
FIG. 1 is a side view of the automated poultry hanger, showing how the shackles are tilted to a horizontal position to engage the birds.

Referring now in more detail to the drawings, in which like numerals indicate like parts in the several views, FIG. 1 is a side view of the bird hanging area 10 of the poultry processing line. A conventional continuous I-beam rail 14 extends through a plurality of bird processing areas of the processing plant, including the hanging area of the poultry processing plant. Shackles 12 move in sequence from the bird hanging area of FIG. 1 on the I-beam rail 14 in the conventional manner through the bird processing plant, each shackle hanging vertically from the I-beam rail. A typical shackle is shown in FIG. 2 and includes a support stem 2, a pair of leg receiving support loops 3 suspended from the support stem, and a pair of support wheels 4 supported by a U-shaped clevis 5.

In the bird hanging area shown in FIG. 1, the I-beam rail 14 includes a downwardly sloped segment 16, a lower horizontal segment 18, and an upwardly sloped segment 20. The downwardly sloped segment of the I-beam is progressively twisted about its length so that the shackles moving along the downwardly sloped segment progressively tilt from a suspended vertical attitude toward a horizontal attitude. The lower horizontal segment 18 of the I-beam continues in a constant orientation so the shackles move in their horizontal attitude along the lower horizontal segment of the I-beam toward the upwardly sloped segment 20. The upwardly sloped segment of the I-beam is progressively twisted about its length in a reverse twist from the twist of the downwardly sloped segment 16, so the shackles tilt from a horizontal attitude back to the suspended vertical attitude.

The birds 25 are retrieved by the shackles as the shackles move in their tilted horizontal orientation.

Figure 2:
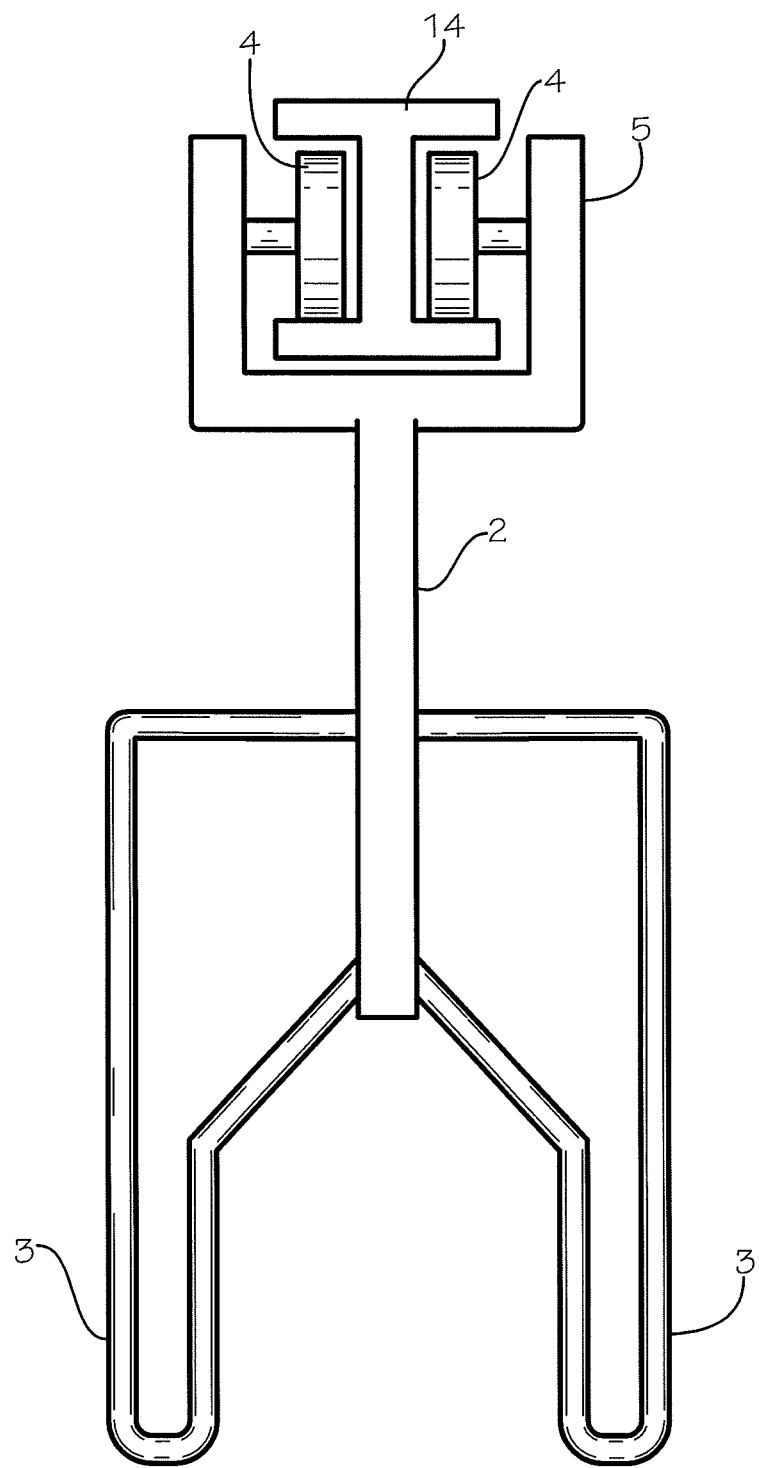
FIG. 2 is a front view of a typical shackle used to support birds during the processing of the birds.
Figure 3:
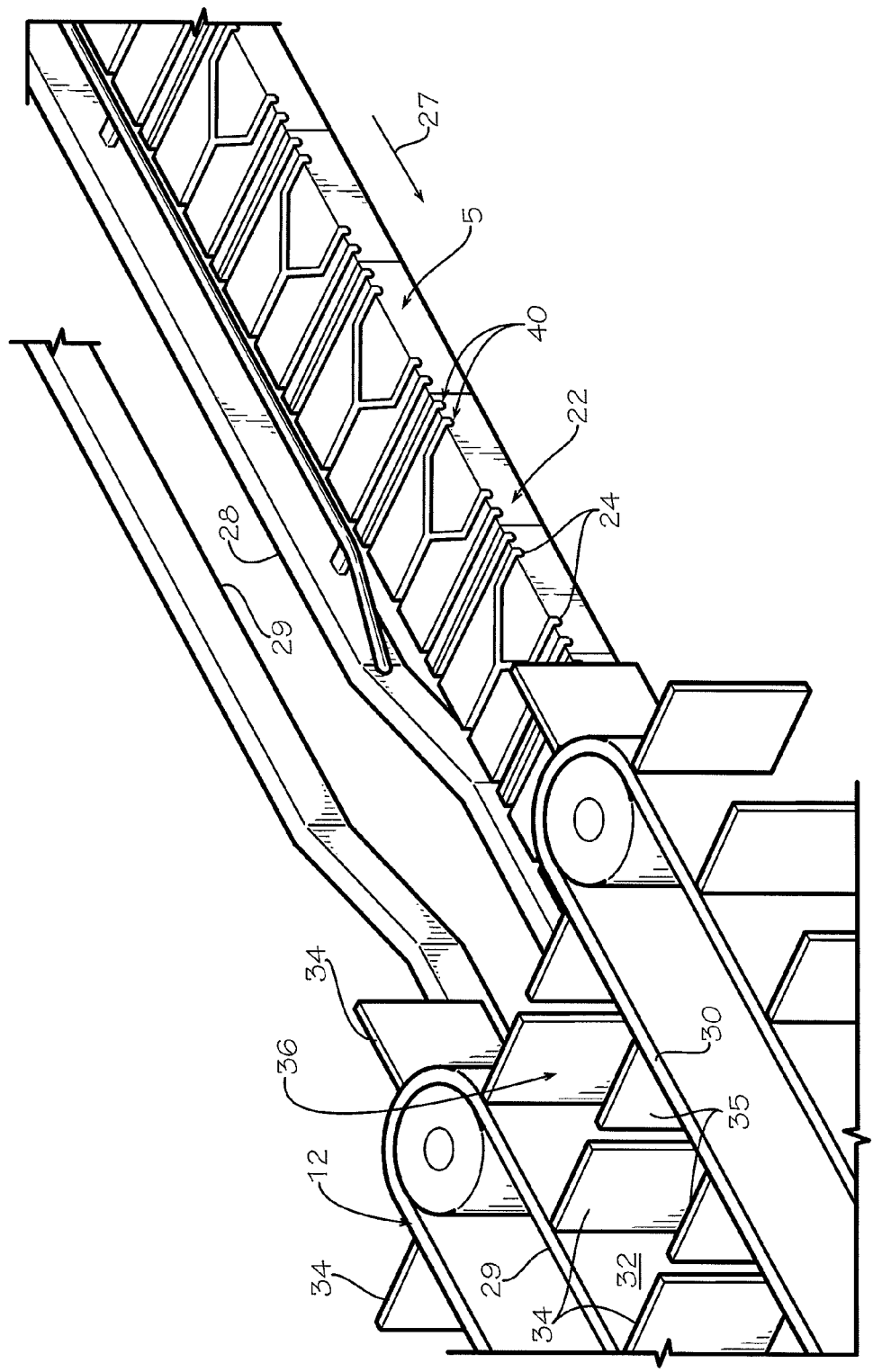
FIG. 3 is a perspective view of the lower horizontal segment of the processing.

As shown in FIG. 3, a surface conveyor belt 22 is formed of a plurality of conveyor segments that each includes a recess 24 that is shaped like the profile of a shackle of FIG. 2, in that it includes a recess that matches the shape and size of the legs and support stems of a shackle. The surface conveyor belt 22 moves in the direction indicated by arrow 27, and a pair of inwardly facing parallel conveyor belts 29 and 30 straddle the outwardly facing surface of the surface conveyor belt 22 to form with the surface conveyor belt a longitudinally extending open top channel 32. Dividers 34 and 35 extend inwardly toward one another from the inwardly facing parallel conveyor belts 29 and 30, forming an open top box positioned over each recessed shape of the shackle moving with the surface conveyor belt 22. The dividers project toward each other and move in unison with the inwardly facing parallel conveyor belts 29 and 30 to form a series of open top boxes 36 that receive the birds.

A plurality of guide bars 27, 28 and 29 extend along and over the surface conveyor belt 22 and function to tilt the shackles 12 onto the surface conveyor belt so that the shackles enter the shapes 40 formed in the upper surface of the surface conveyor belt 22. The shackles are recessed down into the shackle shapes 40.

As the surface conveyor belt 22 begins its movement between the inwardly facing parallel conveyor belts 29 and 30, the dividers form the bird receiving boxes, and the birds are placed in the boxes. Typically, the birds will stand in the boxes as the conveyor system continues to move.

When the birds 25 have been received in the open top boxes formed by the inwardly facing parallel conveyor belts 29 and 30 and their respective dividers 34 and 35, the legs of the birds tend to be positioned in alignment with the leg receiving loops 3 of the shackles shown in FIG. 2.

Figure 4:
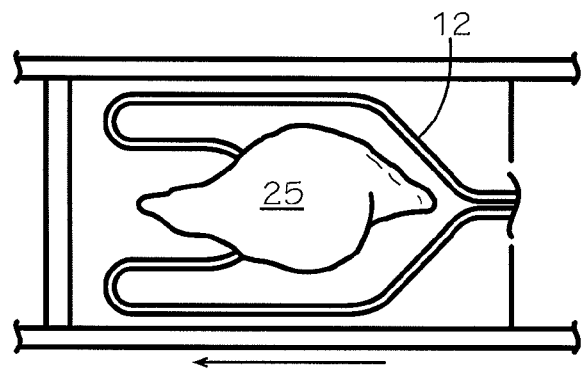
FIG. 4 is a plan view of a bird in the open top box, over a shackle.
Figure 5:
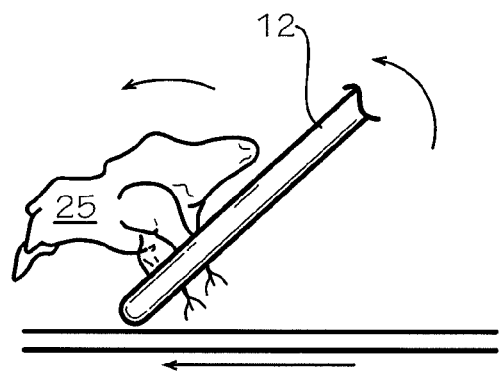
FIGS. 5 and 6 are progressive side views of the bird and the shackle in an open top box on the surface conveyor, showing how the birds are captured by the shackles.
Figure 6:
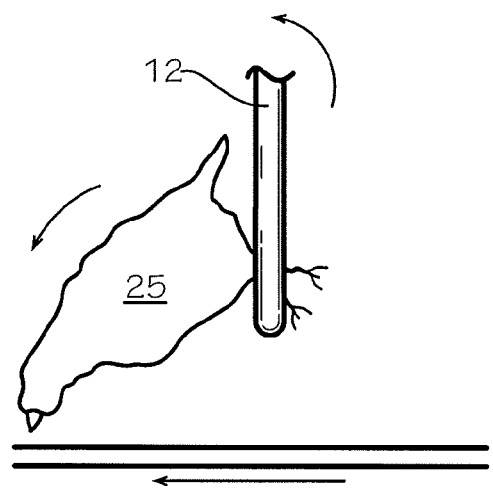

As shown in FIGS. 4-6, the shackles are progressively lifted away from the surface conveyor and are tilted back from the horizontal attitude of FIG. 4 toward a vertical attitude of FIGS. 5 and 6. As the shackles tilt, the shackles push the bird's body in front of the shackle while the legs of the birds remain behind the shackle, and as the shackles are lifted away from the conveyor system, the legs of the bird tend to slip downwardly into the narrower confines of the shackle leg receiving loops 3.

In the foregoing specification, this invention has been described in relation to certain preferred embodiments thereof, and many details have been set forth for purposes of illustration. It will be apparent to those skilled in the art, however, that the invention is susceptible to additional embodiments and that certain of the details described herein can be varied without departing from the basic principles of the invention.

The invention claimed is:

1. An apparatus for automatically hanging live birds onto an overhead shackle system, comprising:
    a series of bird hanging shackles;
    an overhead I-beam rail for supporting and guiding said shackles;
    a horizontal conveyor for conveying said live birds adjacent said shackles;
    first shackle orienting means for causing said shackles to be displaced from a vertical orientation relative to said horizontal conveyor means to a horizontal orientation, wherein said shackles lie in a plane substantially parallel to the plane of said horizontal conveyor;
    second shackle orienting means for causing said shackles to be displaced from said horizontal orientation back to a vertical orientation, wherein at least one leg of the live birds is captured by said shackle as said shackle moves from said horizontal orientation to said vertical orientation, and the birds hang in a head-down position, and
    wherein said horizontal conveyor comprises a plurality of recesses formed therein for successively receiving said shackles in the horizontal orientation.

2. An apparatus according to claim 1, wherein said first shackle orienting means comprises a first 90 degrees twist and said second shackle orienting means comprises a second 90 degrees twist opposite said first 90 degrees twist.

3. An apparatus according to claim 1, comprising:
    a secondary conveyor means having a plurality of sections cooperating with said horizontal conveyor means to restrain said live birds.

4. An apparatus according to claim 1, wherein the secondary conveyor means comprises a pair of vertical conveyor belts having a series of transversely projecting tabs extending therefrom for restraining the live birds on said horizontal conveyor means.

5. An apparatus for hanging live birds by their feet in shackles and moving the birds in sequence through a poultry processing plant, the apparatus comprising a surface conveyor system that moves in timed relationship with the moving birds, the surface conveyor system including a surface conveyor belt with an outwardly facing surface and two inwardly facing parallel conveyor belts that straddle the outwardly facing surface of the surface conveyor belt and form with the surface conveyor belt a series of open top boxes for receiving the birds.

6. The apparatus of claim 5, and further including a recessed shape of a shackle formed in the upwardly facing surface of the surface conveyor belt at intervals along the surface conveyor belt.

7. The apparatus of claim 5, wherein the facing parallel conveyor belts include dividers that project across the path of the conveyor belts so that the conveyor belts and the dividers define open top boxes positioned over the surface conveyor system.

8. A method of hanging birds by their feet on a shackle conveyor comprising;
    placing shackles in a horizontal attitude in a recess formed in the surface conveyor,
    placing birds on the horizontal shackles with the feet of the birds on the shackles,
    tilting the shackles, and as the shackles tilt pushing the body of the birds with the shackles and capturing the feet of the birds in the shackles.

9. The method of claim 8, wherein the step of tilting the shackles comprises tilting the upper portion of the shackles in an arc over the lower portion of the shackle.

10. The method of claim 8, wherein the surface conveyor includes a series of open top boxes, and the step of placing the shackles in a horizontal attitude comprises placing each shackle at the position of one of the open top boxes and placing birds on the shackles in the boxes.

* * * * *